United States Patent [19]

Baasch et al.

[11] Patent Number: 5,530,606
[45] Date of Patent: Jun. 25, 1996

[54] LOW PROFILE HEAD SUSPENSION ASSEMBLY

[75] Inventors: Holger J. Baasch, Wabasha; William W. Brooks, Jr., Rochester; Jerome T. Coffey, Oronoco; David L. Roach, Rochester, all of Minn.

[73] Assignee: International Business Machines Corporation, Armonk, N.Y.

[21] Appl. No.: 356,043

[22] Filed: Dec. 14, 1994

Related U.S. Application Data

[63] Continuation of Ser. No. 109,296, Aug. 19, 1993, abandoned.

[51] Int. Cl.$^6$ ........................................................ G11B 5/60
[52] U.S. Cl. .......................................... 360/104; 360/103
[58] Field of Search .................................. 360/103, 104, 360/105

[56] References Cited

U.S. PATENT DOCUMENTS

| | | |
|---|---|---|
| 3,071,773 | 1/1963 | Haughton et al. . |
| 3,310,792 | 3/1967 | Groom et al. . |
| 3,581,298 | 5/1971 | Billawala ........................ 340/174.1 E |
| 3,582,920 | 6/1971 | Billawala ........................ 340/174.1 E |
| 3,640,836 | 2/1972 | Oberst et al. ............................ 161/165 |
| 3,668,668 | 6/1972 | Robitschek ...................... 340/174.1 E |
| 3,701,610 | 10/1972 | Buslik et al. . |
| 3,702,461 | 11/1972 | Cantwell ........................ 340/174.1 E |
| 4,630,158 | 12/1986 | Spash ..................................... 360/103 |
| 4,819,094 | 4/1989 | Oberg .................................... 360/104 |
| 4,885,051 | 12/1989 | Hwang et al. ......................... 156/345 |
| 4,992,898 | 2/1991 | Wanlass ................................ 360/104 |
| 5,006,946 | 4/1991 | Matsuzaki ............................. 360/104 |
| 5,079,659 | 1/1992 | Hagen ................................... 360/104 |
| 5,124,865 | 6/1992 | Atesmen et al. ..................... 360/103 |
| 5,282,102 | 1/1994 | Christianson ....................... 360/104 |
| 5,282,103 | 1/1994 | Hatch et al. ......................... 360/104 |
| 5,291,360 | 3/1994 | Foote ................................... 360/104 |

FOREIGN PATENT DOCUMENTS

| | | | |
|---|---|---|---|
| 3-189976 | 8/1991 | Japan | ................................... 360/104 |
| 5-20825 | 1/1993 | Japan | ................................... 360/104 |
| 2193833 | 2/1988 | United Kingdom . | |
| 9205542 | 4/1992 | WIPO . | |
| 9209076 | 5/1992 | WIPO . | |
| 9213345 | 8/1992 | WIPO . | |

OTHER PUBLICATIONS

IBM TDB, vol. 26, No. 2, Jul. 1983, pp. 846–849, G. H. May, Two Stage Disk File Actuator.

Primary Examiner—Stuart S. Levy
Assistant Examiner—William J. Klimowicz
Attorney, Agent, or Firm—Laurence R. Letson

[57] ABSTRACT

A load beam for a direct access storage device is disclosed as having an integral flexure formed of two generally uniform cross section intersecting beams with one of the beams extending between two projecting arms of the load beam. The flexure is spaced from an attached slider by a frustroconical projection formed on the flexure. The pitch and roll of the slider is limited by forming surfaces on the load beam structure that will engage the slider as the slider either pitches or rolls excessively. Overlying the flexure and the slider and adhesively engaged with the flexure is a damping layer of visco-elastic material which will absorb energy and suppress undesirable vibrations. The damping layer is provided with tabs or extensions that are adhered to the projecting arms of the load beam to enhance the vibration damping function of the layer.

21 Claims, 7 Drawing Sheets

LOW PROFILE HEAD SUSPENSION ASSEMBLY

This is a continuation of application Ser. No. 08/109,296, filed Aug. 19, 1993, now abandoned.

FIELD OF THE INVENTION

This invention relates to head suspension assemblies involving load beams and sliders for use in hard disk drives, and specifically to a load beam and flexure support with increased load capabilities, damping, and improved attachment of a slider and the related signal wires to the flexure.

BACKGROUND OF THE INVENTION

As disk drives continue to be reduced in size, the load beam or the beam which is used to hold and position a magnetic head in close proximity to the rotating disk in the disk drive also must be made smaller. The reduced size of the load beam makes attachment of the sliders more difficult than prior attachment techniques.

Further, as the disk drives are reduced in size, the recording density on the disks is greatly increased. These two factors, reduced disk drive size and increased recording density, not only dictate that the parts required for the disk drive assembly must be reduced in size, but also that the fly height of the small sliders must be further reduced from that of the previously known disk drives. The fly height reduction requires improved slider pitch and roll.

As recording density is increased, the vibrations of the slider tend to become more significant. The oscillations of the slider either must be eliminated or must cease prior to any read/write operations to allow the head to be stable as well as the slider to be in close proximity to the disk surface and track centerline to insure reliable recording and reading of the data stored on the disk.

As a further consequence of size reduction of the elements in the apparatus, the support members which hold and constrain the slider may be flexed beyond a predetermined amount; when so flexed, these support members may come into contact with the edges of the slider and effectively block the pitch and roll movement of the slider. To block the movement of the slider effectively creates a rigid member which may contact or impact the disk surface and may damage the disk surface and/or the slider structure.

The slider must be firmly attached to the load beam with even smaller attachment regions or zones. The attachment zones, therefore, must be maximized in order to insure that the attachment of the slider to the flexure of the load beam is effective and reliable. Also, maximizing the area of a bond is important in obtaining a reliable bond.

The wiring connected to the slider does resist pitch and roll movement of the slider. As the slider air bearing features are reduced in size, the effect of the electrical conductors of the wiring on the head becomes more significant as compared with other forces. The restraining influence of the wiring on the head with respect to its pitch and roll movement must be minimized, while at the same time the wiring must be positioned and restrained in such a manner which will resist the wiring being pulled from the slider, thus rendering ineffective the electro-magnetic function of the slider. Also, the wire, when looped away from the load beam for connecting the slider, consumes excessive height which defeats efforts to minimize the overall disk drive height.

Movement of the slider in a pitch and/or roll direction is necessary for the slider to remain a substantially constant fly height above the surface of the rotating disk of the disk drive. The slider must be free to respond to very minute deviations from a perfect plane as the disk rotates at high speed to read and write reliably the data on the magnetic recording member as well as to prevent the slider from impacting the surface of the rotating disk and thus destroying some of the magnetic disk coating and the data stored therein.

To accommodate the pitch and roll of the slider and magnetic head in response to the movement of the disk past the slider, and accordingly to maintain a constant fly height over the surface of the disk, those forces resisting the pitch and roll of the slider must be extremely small. The pitch and roll movement is primarily required due to geometric imperfections between disk stacks and actuator positioning. To accommodate the small forces and still to permit the pitch and roll movement, a small cross sectional support for the slider is used. The small cross sectional supports are weak and subject to over-stress and damage from large deformations. In addition, it is undesirable to permit excessive movement of the slider during handling and assembly of the disk drive. Accordingly, the excessive movement of the slider must be prevented in order to prevent damage to the slider, the flexure support, or the disk surface.

Accommodating all of the foregoing conditions and requirements becomes a significant undertaking when designing the load beam/slider assembly for use in a small disk drive.

SUMMARY OF THE INVENTION

An object of the invention is to improve the data access speeds and reliability of a disk drive by damping undesired and extensive slider oscillations.

It is another object of the invention to increase the force loading on the slider while at the same time preserving the pitch and roll movement freedom necessary for the slider to adapt to and follow the surface deviations of the magnetic disk upon which it will be recording and from which it will read magnetically recorded data.

It is a still further object of the invention not only to minimize the affect of the electrical wiring leading to the slider on the slider flight characteristics but also to strain relieve the wiring in order to isolate undesired forces from the wiring on the slider.

It is an additional object of the invention to control the wiring to present a minimum height of the load beam and associated wiring.

It is still another object of the invention to improve and raise the bonding strengths between the slider and the flexure of the load beam.

The foregoing objects and others are accomplished by the present invention while the shortcomings of prior approaches are overcome under the conditions within which the load beam and slider assembly must operate.

A disk drive load beam typically is formed of relatively thin sheet metal with reinforcing flanges to increase the rigidity of the load beam. Near the distal end of the load beam, a flexural support member, referred to as a flexure, must be disposed. The disposition of the flexure near the distal end permits the load beam to be positioned over the surface of a rotating magnetic disk in order to place a slider containing a magnetic read/write head in close proximity to the surface of the disk and to scan across the disk in a substantially radial direction relative to the disk, while the disk rotates relative to the load beam. The flexure supports the slider in such a manner that the slider may move about the pitch and roll axis and thus respond to slight variations in the height of the surface of the magnetic disk from a perfect plane. The slider responds to the air flow under the slider and over the disk surface; thus the slider flies relative to the disk.

The slider physically is attached to a portion of the flexure by glue or cement at one or more distinct points referred to as attachment zones.

The gluing or cementing must be effective not only to withstand the weight of the slider but also those forces exerted thereon during flight over the surface of the magnetic disk. With the reduction in size of the parts of the disk drive, as discussed above, the attachment zones between the slider and the flexure likewise are reduced in size. Then it becomes necessary to maximize the size of the attachment zones to maximize the attachment strength. This maximization of the attachment or gluing zones is achieved by positioning the slider attaching legs of the flexure at an angle with respect to the support legs, thereby creating an acute and an obtuse angle with the support beam of the flexure. This angular disposition permits a larger attachment zone with respect to the surface of the flexure and the surface of the slider and thus permits a more reliable attachment.

During the operation of the disk drive and the rotation of the disk relative to the slider, it is necessary to exert a load on the slider to force the slider toward the surface of the rotating disk. The required loading of the slider for consistent and reliable magnetic read/write operations may exceed the loading which may be exerted on the slider through the flexure portion of the load beam in order to maintain pitch and roll response. The need for higher gram loads to help resist file shock damage exacerbates this effect. Accordingly, it has become desirable to include a protruding dimple on the slider side surface of the flexure, located at the junction of the cruciform arms or beams. Generally this dimple is frustroconical in shape with a very small flat surface located at the protruding point of the dimple. The frustroconically shaped dimple is disposed with its base joined to the flexure and projected outwardly from the plane of the surface of the flexure.

The plane of the frustroconical structure opposite the plane of attachment with the flexure, referred to as the tip, is maintained as small as possible to approach a point engagement with the back of the slider. The dimple acts as a spacer to separate the slider and the cruciform support arms whenever the operational loading is exerted on the slider to force the slider into very close proximity to the surface of the disk, and overcoming the aerodynamic effect of a thin film of moving air intermediate to the slider and the disk surface. By spacing the back surface of the slider from the cruciform junction and the cruciform support arms, increased loading then may be exerted by the load arm onto the slider before the cruciform support arms flex enough to contact and interfere with the movement of the slider during pitch and roll.

For low cost while preserving function the head suspension assembly must have the slider and magnetic head wired efficiently without unduly affecting the pitch and roll of the slider and without unduly affecting the aerodynamic characteristics of the slider.

The strain relief attachment of the wires not only must be relatively easy to manufacture efficiently but also must be sturdy and resist forces which otherwise would damage or destroy the wire to slider joint.

An insulation layer of thermoplastic material is disposed between the flexure and the wires. Preferably, the thermoplastic layer is installed on the back surface of the flexure, and then the wires are forced into the heat softened thermoplastic layer which is also insulative. Upon cooling, the wires then are engaged with and fixed in the structure of the thermoplastic insulating layer. A further retention of the wires may be accomplished by disposing an adhesive patch in surface-to-surface engagement with the thermoplastic layer and overlying the wiring. Thereafter, the wire extending past the thermoplastic layer/adhesive patch structure is then stripped of insulation, preferably by an excimer laser. The excimer laser removes the insulation but does not destroy the very fine wires. Then the wires are bonded or soldered to the slider at appropriate attachment points.

Whenever the slider oscillates, the slider is not being maintained near the surface of the magnetic disk with regard to both height above the disk surface and with respect to the slider lateral position relative to the recording track. During the peaks of the oscillation, the magnetic head of the slider may be disposed at a distance greater than that through which reliable recording and reading of recorded data on the disk surface may be accomplished or sufficiently off track to make unreliable the reading or writing of data. Accordingly, the data being read or the data being stored on the disk may not be read or stored reliably thus destroying the effectiveness of the overall disk drive assembly.

Consequently, it is desirable to install a damping member which will attenuate the oscillations of the slider and also will hasten the damping of any oscillations present allowing the head to return to a stable read/write position.

The damping member takes the form of a thin visco-elastic layer deposited on the back side of the cruciform shaped flexure. The layer preferably engages the arms of the load beam which supports the support arms of the flexure. As the flexure is twisted by the movement of the magnetic head and the slider, the visco-elastic material making up the damping layer will be deformed and absorb energy which will not be released back to the flexure structure; this will effectively damp the oscillations of the flexure structure and the slider. The damper relies on the shear distortion of the visco-elastic damping material to dissipate the slider vibrational energy, as heat. The distortion is created by the relative motion of the slider to the load beam and the fact that the damping material is bonded to both of these parts of the structure.

The thermoplastic layer used to attach the electrical wiring to the flexure of the load beam may serve the additional function as a damping member if it is provided with the tabs or ears which then are bonded to and engaged with the arms of the load beam. In the preferred embodiment, the thermoplastic layer would be split into two layers and would have an elastic constraining layer between these two layers to enhance the damping effectiveness.

Due to the very thin sections of the flexure, the slider attached to the flexure may be moved very easily; any large movement of the slider will potentially over-stress the support arms of the flexure. It is, therefore, necessary to prevent damaging movement of the slider with respect to the load beam.

During fabrication processes such as stamping and/or etching, the load beam may be fabricated to provide a movement limiting stop. The load beam may have a coining operation performed on it during the piercing and stamping operations used to form the load beam structure, such that the material positioned closely to the flexure and overlying a portion of the slider may be coined to provide an additional relief between the load beam surface and the corners of the slider after they have been assembled. The additional relief will permit movement of the slider under normal circumstances. However, the load beam surface will reside sufficiently close to the surface of the slider at the slider corners to prevent excessive and damaging movement of the slider and thereby prevent the over-stressing of the flexure due to mishandling or excessive forces prior to assembly of the disk drive. Alternatively, the load beam may be partially etched in the region overlying the corners of the slider to reduce the thickness of the metal of the load beam at that point and thus increase the clearance, as was previously described in relation to the coining operation. During the normal operation of the disk drive, the slider is unrestricted by the stop surfaces in its roll and pitch movement.

Any of the above aspects of the invention may be incorporated into a load beam, but the preferred embodiment is to incorporate at least one version of each of the aspects briefly described above.

A more complete understanding of the invention may be had from the drawings and detailed description to follow.

DETAILED DESCRIPTION OF THE PREFERRED EMBODIMENT OF THE BEST MODE CONTEMPLATED BY THE INVENTORS FOR CARRYING OUT THEIR INVENTION

Figure 1:
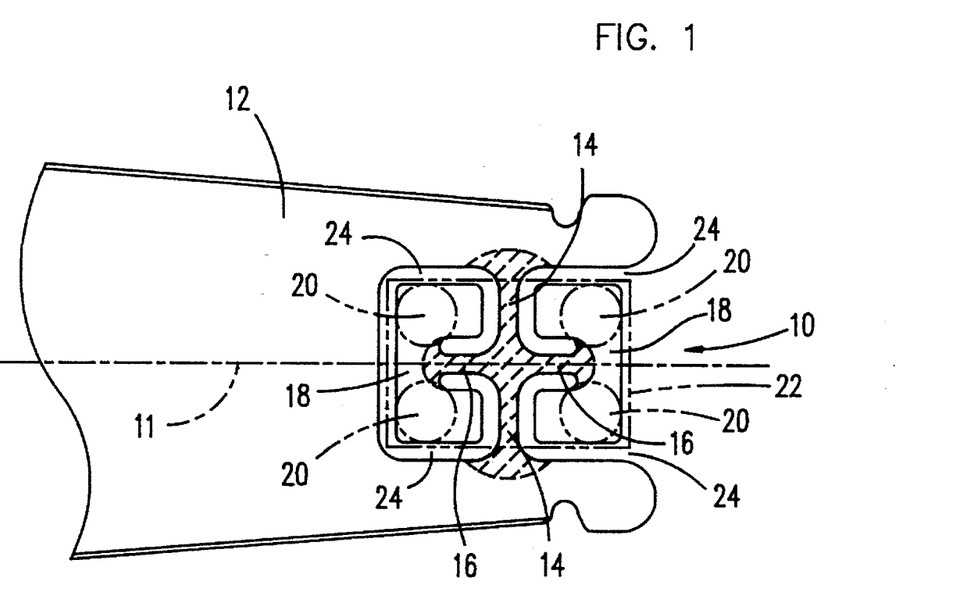
FIG. 1 is an illustration of a load beam and flexure.

FIG. 1 illustrates a cruciform shaped flexure support 10, hereafter flexure 10, integrally formed as a part of the load beam 12. Cruciform support 10 typically is formed by removal of the metal surrounding the flexure support arms 14 and attachment arm 16 and attachment pads 18. Each attachment pad 18 provides two zones 20 to facilitate gluing or cementing the attachment pads 18 to the slider 22, which is shown only in outline form. Each attachment pad 18 is approximately divided equally into two regions where glue or cement may be deposited. By virtue of the geometry, these regions are quite small. While gluing the attachment pads 18 at zones 20 normally provides the necessary attachment forces for holding slider 22, the extremely small size of the attachment zones 20 make assembly exceedingly difficult, expensive, and time consuming. It is not necessary to cement glue zones 20 and slider 22 at four attachment points if these glue zones 20 are sufficiently large.

The formation of the flexure arms 14, 16 is accomplished by an etching process where the portions of the metal to be preserved are masked, and the load beam 12 is submerged in a suitable liquid, such as ferric chloride, for the chemical removal of metal in unmasked areas.

The removal of metal from regions 24 forms the attachment pads 18 and the flexure arms 14, 16. Flexure arms 14, 16 then are additionally etched to reduce the thickness of the metal to make them more responsive to lesser forces exerted thereon by the slider 22 during its flight over the surface of a magnetic disk 65 in FIG. 14, within the disk drive 70.

The flexure arms 14, 16 may be etched from both sides of the metal stock forming load beam 12 or may be selectively etched from only a single side, as desired. After etching of the flexure arms 14, 16, the remaining thickness can be as little as 0.025 mm.

It is important in the formation of the flexure arms 14, 16 that a substantial length of the arms 14, 16 be uniform in thickness and width so as to not unduly concentrate stresses within the flexure arms 14, 16 during movement of the attachment pads 18 in response to pitch and roll of the slider 22 during flight over the disk 65.

Figure 2:
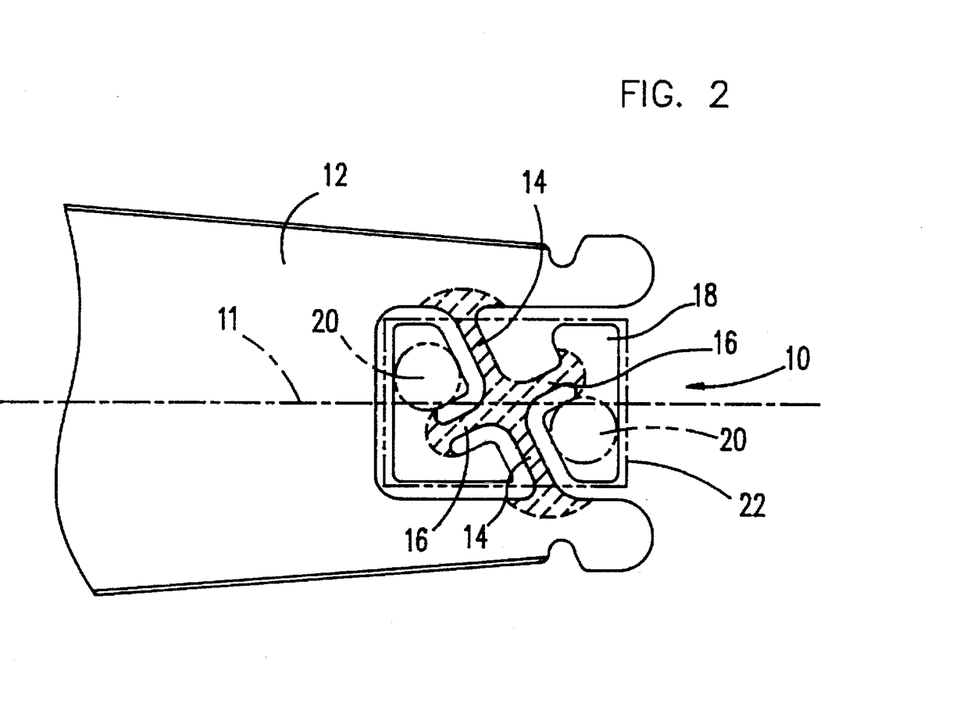
FIG. 2 illustrates an alternate flexure design.

Should the size of the load beam 12 and other components of the flexure 10 be such that the attachment zones or glue zones 20 are too small to reliably attach the slider 22, the attachment zones or glue zones 20 may be increased in size by the re-orientation of the flexure arms 14, 16 as illustrated in FIG. 2. By re-orienting the flexure arms 14 to a position which is not perpendicular to the axis 11 of the load beam 12, the flexure arms 16 may be fabricated and joined to the attachment pads 18 at points near one end of the attachment pad 18 leaving an enlarged glue or cement attachment zone 20. The two larger attachment zones 20 are adequate for joining the slider 22 with the flexure 10.

The fabrication of the flexure 10 in FIG. 2 is fully analogous to the fabrication steps necessary for flexure 10 in FIG. 1.

Assuming that the gluing operation will result in a circular engagement of the glue with the attachment pads 18 and that the entire glued zone 20 remains on the attachment pad 18 and does not spread into the regions surrounding the attachment pad 18, as illustrated in FIG. 2, the re-orientation of the flexure 10 will result in an approximate 14% increase in area of glue engagement over the area of each attaching area 20 in FIG. 1.

A further benefit of the arrangement as illustrated in FIG. 2 is the increased length of the flexure arms 14. With increased length in flexure arms 14, there is a corresponding reduction in stresses within the metal forming the arms 14.

Figure 3:
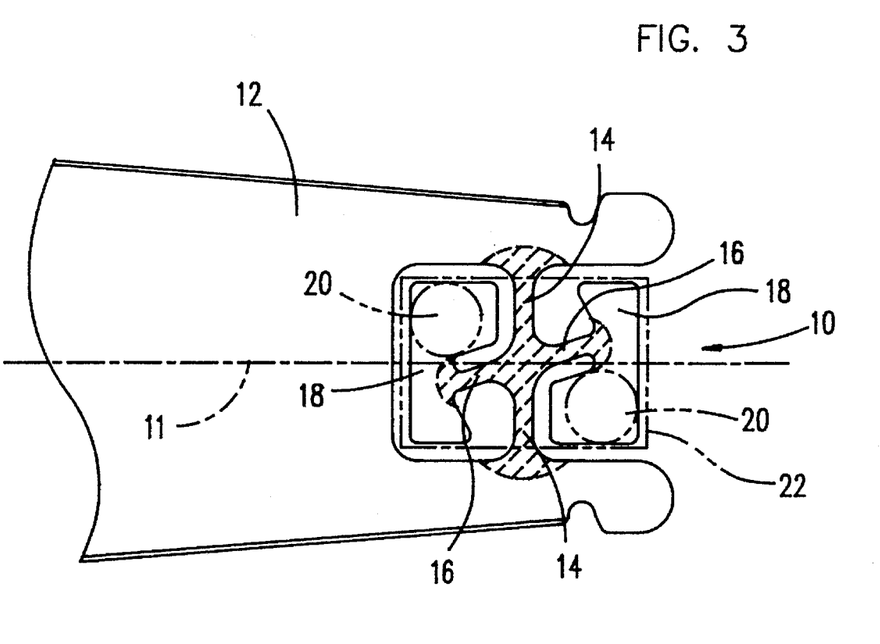
FIG. 3 illustrates a still further alternative in the design of the flexure and the preferred embodiment of the invention.

A further improved arrangement of the flexure 10 is illustrated in FIG. 3, where the flexure arms 14 are positioned perpendicular to the axis 11 of load beam 12 and where the arms 16 of flexure 10 are disposed to form an acute angle and an obtuse angle with respect to flexure arms 14. This arrangement substantially increases the area on mounting tabs 18 which may be used for attachment zones 20. The arrangement of FIG. 3 permits an increase for each attachment zone 20 by a factor of more than 80% over the areas of each respective attachment point 20 in FIG. 1, and an increase of approximately 60% over the area of each attachment zone 20 in FIG. 2. In other respects, the fabrication of the load beam 12 and flexure 10 illustrated in FIG. 3 is the same as that for load beams 12 and flexures 10 in FIGS. 1 and 2.

Figure 4:
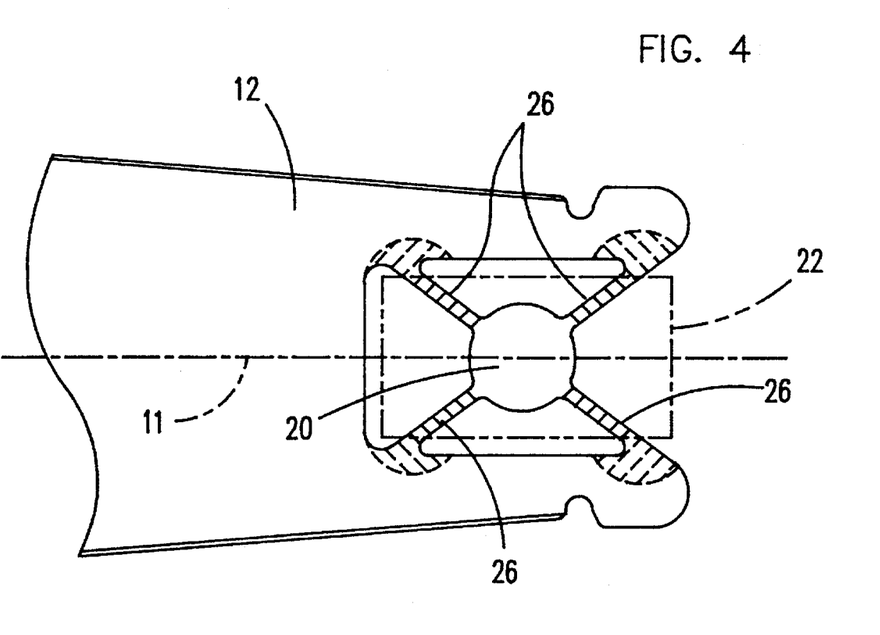
FIG. 4 is an illustration of a single bonding pad flexure.

Referring to FIG. 4, a single attachment zone 20 is illustrated with flexure beams 26 spanning between the load beam 12 and the attachment zone 20. The arrangement in FIG. 4 further increases the area of the attachment zone 20 but with a sacrifice of pitch and roll movement of the slider 22, due to the possibility of engagement of the flexure beams 26 by the edge of slider 22, as well as a substantially increased pitch and roll stiffness before contact.

Figure 5:
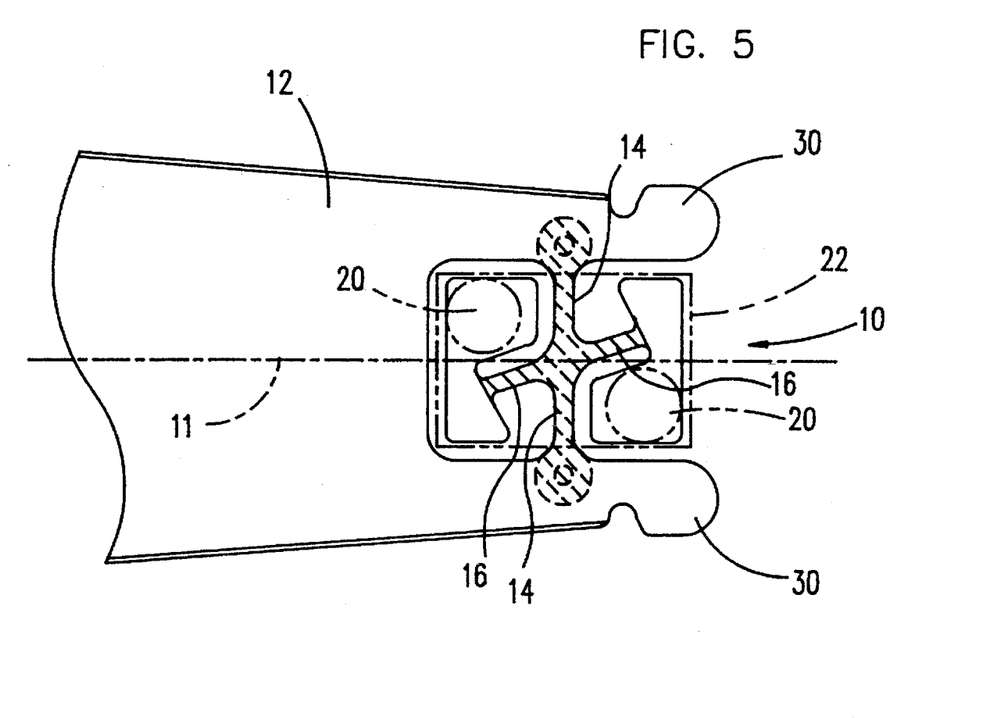
FIG. 5 is an illustration of a separately manufactured flexure and its welding attachment to the load beam.

With respect to FIG. 5, the flexure 10 illustrated in FIG. 3 is modified and manufactured separately and then welded to the distal arms 30 of load beam 12. The cruciform portion of the flexure 10 similarly may be etched from one side or both sides of the sheet stock from which it is formed. Etching from a single side will permit maximum clearance obtainable between the cruciform portion of flexure 10 and the slider 22 when assembled.

Figure 6:
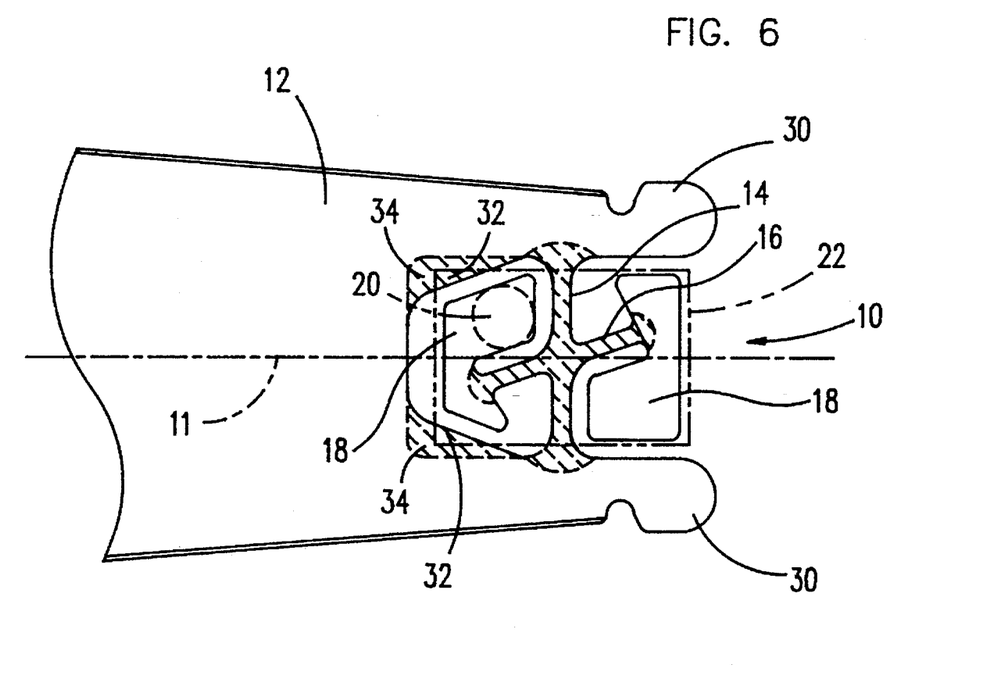
FIG. 6 illustrates motion limiting structures to prevent excessive movement of the slider.

FIG. 6 illustrates an approach to limiting excessive pitch and roll movement of the slider 22 which can result in the over-stressing of the flexure arms 14, 16. During the fabrication through etching of the flexure 10 and attachment pads 18, the thin inboard attachment pad 18' may be modified slightly in shape, with only a small sacrifice in the attachment zone 20 area, to leave stop regions 32 of the load beam 12 overhanging corners 34 of slider 22. These stop regions 32 will prevent the movement of corners 34 upwardly out of the plane of the FIG. 6 and thereby limit the movement of slider 22. This is particularly desirable during handling and assembly of the load beam 12 since the slider 22 may be exposed to forces during handling and assembly which greatly exceed the gram loading forces exerted during operation on the load beam 12 and flexure 10.

In order to provide sufficient clearance for normal pitch and roll movement of slider 22, the bottom surface of stop region 32, that being the surface closest to slider 22, may be relieved away from slider 22 by etching to reduce the thickness of the sheet metal stock of which load beam 12 is fabricated. By removing a portion of the metal in stop regions 32, the increased clearance created between slider 22 and stop region 32 will permit normal pitch and roll movement of slider 22 without stop region 32 interfering with the corner 34 of slider 22.

Figure 7:
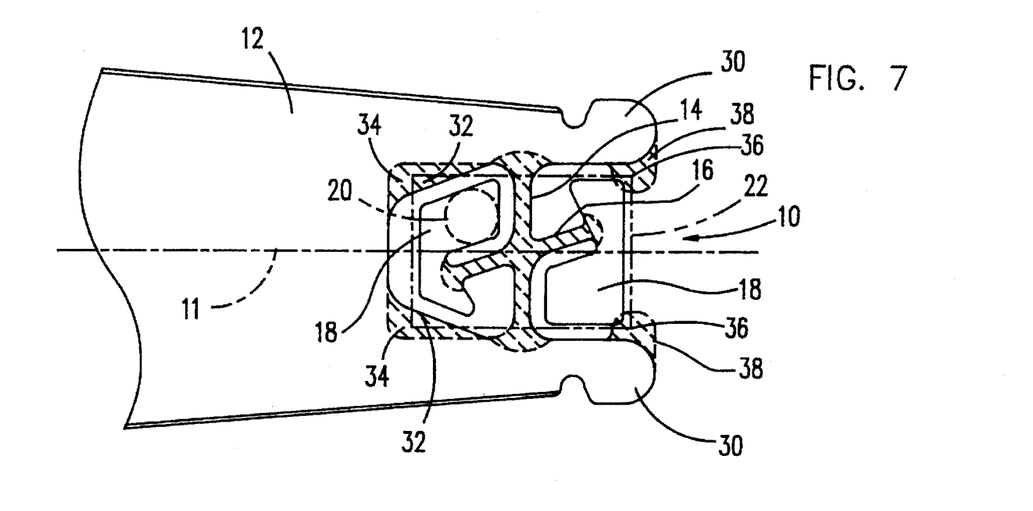
FIG. 7 illustrates alternative motion limiting structures.

A further embodiment of the motion limiting structure of FIG. 6 may be found in FIG. 7 wherein two additional tab projections 38 may be formed to project inwardly from the distal ends of arms 30. Tab projections 38 extend inwardly toward each other and overlie corners 36 of slider 22, further restricting the excessive movement of slider 22. The formation of the projections 38 may be accomplished at the same time as the other etching operations; the reduction in the thickness thereof provides the necessary clearance for pitch and roll movement of slider 22 during operation of the disk drive 70.

An alternate manufacturing approach for regions 32 and projections 38 is to coin the metal and projections 38 to thin their cross-sections and to displace the material away from its co-planar position with arm 30 and away from the surface of slider 22, which is proximate to projections 38 and stop region 32. The coining operation accomplishes the same function as the etching operation, provide increased clearance; coining is able to produce even greater clearances than the etching since the etching steps will remove metal stock in the affected regions 32 and tabs 38, while the extent of etching is limited by the stock thickness of the material from which load beam 12 is fabricated.

Figure 8:
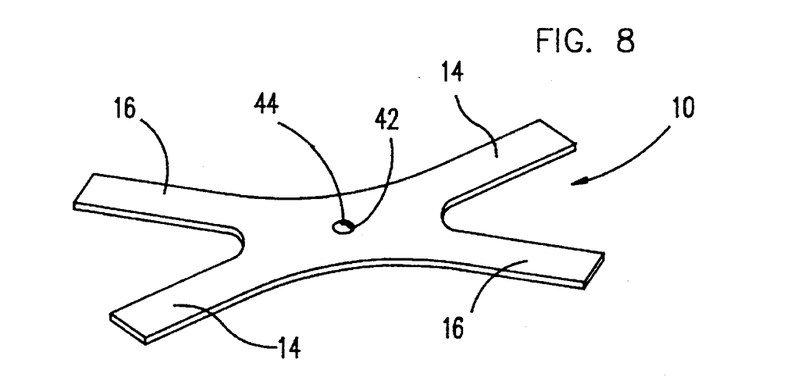
FIG. 8 illustrates the cruciform portion of the flexure with an etched dimple.

Due to the extremely small sizes of the components of the load beam 12, flexure 10, and slider 22, when properly loaded for operation, there exists the possibility that the flexure will be insufficiently displaced from the top surface of slider 22 to reliably permit the pitch and roll movement of slider 22 without the edge of slider 22 engaging a portion of the flexure arm 14. In order to increase the clearance between flexure arm 14 and the edge of slider 22, a spacer formed in the shape of a frustum of a cone 42 is formed, preferably during the etching operation that reduces the thickness of flexure arm 14. The frustum of a cone 42 preferably has a top surface 44 which is a plane surface, the original surface of the sheet metal stock from which the flexure 10 is fabricated. The top surface 44 has a diameter of approximately 0.02 millimeters. The small diameter surface approaches that of a point, yet does not overly concentrate forces in too small an area on the top or back surface of the slider 22. The frustum of the cone 42 is the result of masking a circular spot on the surface of the load beam 12 at the intersection of flexure arms 14, 16 prior to etching. As the etching progresses, the material will be etched to form the frustroconical shape of the remaining material.

Figure 14:
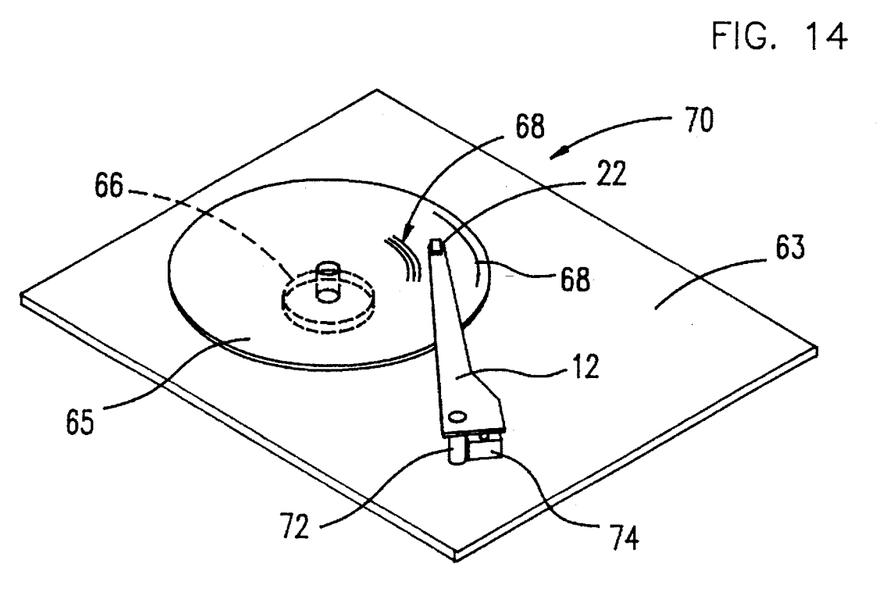
FIG. 14 is an illustration of a magnetic disk drive with the load beam incorporated therein.

As the load beam 12 is loaded with a predetermined gram load to place the slider 22 at the desired fly height above a magnetic disk 65, in FIG. 14, rotating relative to the slider 22, the force is exerted through the end surface 44 of the frustroconical structure 42 and thence onto the back surface of slider 22. The small diameter of the surface 44 on the end of the frustum of a cone 42 does not inhibit the pitch and roll of slider 22, yet maintains desired spacing from the intersection of arms 14, 16 of flexure 10. Flexure arms 14 and 16, and particularly flexure arm 14, will deflect less under a given load so they will carry a larger load before they interfere with the pitch and roll movement of slider 22.

Figure 9:
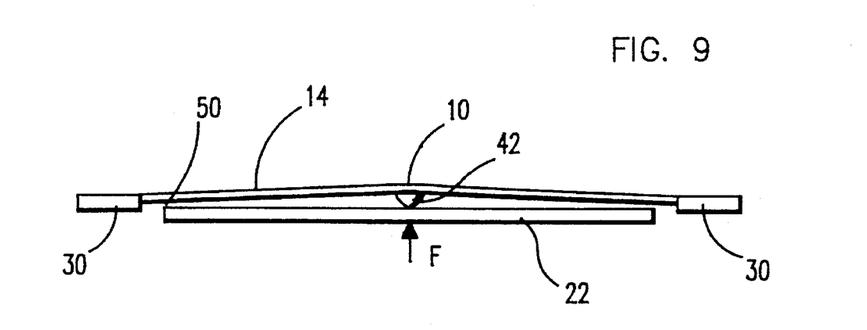
FIG. 9 illustrates a sectional view through the cruciform structure and dimple illustrating the increased minimum clearance maintained between the cruciform junction and the slider.

Referring to FIG. 9, flexure support arms 14 are illustrated in a flexed or loaded condition with the frustroconical structure 42 intermediate to the flexure 10 and slider 22. As can be seen from FIG. 9, a higher degree of deflection in flexure arm 14 is possible before contact between flexure arms 14 and slider 22 occurs at region 50. Flexure arm 14 absorbs virtually all of the gram loading forces when frustroconical structure 42 is incorporated, permitting increase gram loading prior to interference between slider 22 and arms 14.

The etched frustroconical structure 42 is a structure of precise dimensions and may be manufactured during the etching process for the fabrication of the flexure 10 with only limited additional masking. The precision of the etching process permits a tighter tolerance control than the process of forming a dimple in the shape of a frustum of a cone 42 which forces the material to project out the bottom surface of flexure 10.

The frustum of a cone 42, as it permits the increased loading of the load beam 12 and slider 22, also insures that whenever the disk 65 is not rotating, the slider 22 resides on the disk 65 surface and is held there by the larger gram loading attainable via the dimple 42. Holding the slider 22 on the disk 65 surface minimizes damage to the magnetic recording surface from shocks or impacts because the slider 22 does not impact the recording surface and gouge the recording media when bumped or jarred.

Figure 10:
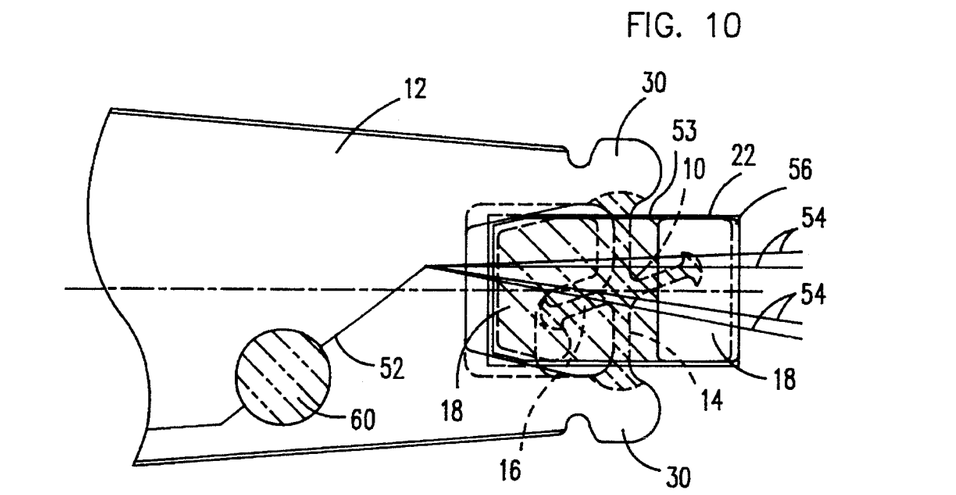
FIG. 10 illustrates the placement of an insulating film on the flexure, and the wire placement for the wires which are connected to the magnetic head within the slider.

In order to send and receive signals to and from the magnetic recording head, not shown, in the slider 22, it is necessary to connect electrical wiring 52 to the magnetic head within the slider 22. At the same time, it is necessary to strain relieve that wiring 52 so that excessive forces may not be exerted through the wiring 52 on slider 22. Referring to FIG. 10, electrical wiring 52 from the controls of the disk drive 70 may be routed to the distal end of load beam 12 by any convenient path provided that path provides some slack in the wires. The wiring 52, comprising individual wires 54, may be retained in a fixed relationship to slider 22 by placement of an insulating layer 53 over substantially all of the flexure structure 10. The insulating layer 53 may be made of a thermoplastic film which is easily deformable when heated. Advantageously, the thermoplastic film insulating layer 53 also may possess an adhesive characteristic such that it may be adhesively applied to the flexure 10 and attachment pads 18. Alternatively, an adhesive may be deposited onto the surface either of the thermoplastic film or of the flexure 10 and attachment pads 18 to permit the adherence of the thermoplastic film insulating layer 53. The wires 54 then may be laid across the surface of the thermoplastic film insulating layer 53 and the film 53 heated to a point where the material softens, permitting the wires 54 to be forced into the thermoplastic film insulating layer 53 for retention.

Thereafter, an additional tacking pad 56 may be placed over the wires 54 which have been retained by the thermoplastic film insulating layer 53. Similarly, tack pads 60 may be positioned on load beam 12 and the wiring 52 be forced into the thermoplastic material for strain relief. Alternatively, the wiring 52 may be placed over the load beam 12 and an adhesive patch, not shown, may be positioned over the wiring 52 to perform the identical function.

After the wires 54 have been retained by the insulating layer 53 and tacking pad 56, the wires 54 then may be stripped of insulation by use of an excimer laser which will remove the insulation without damaging the conductors within the wire 54.

Figure 11:
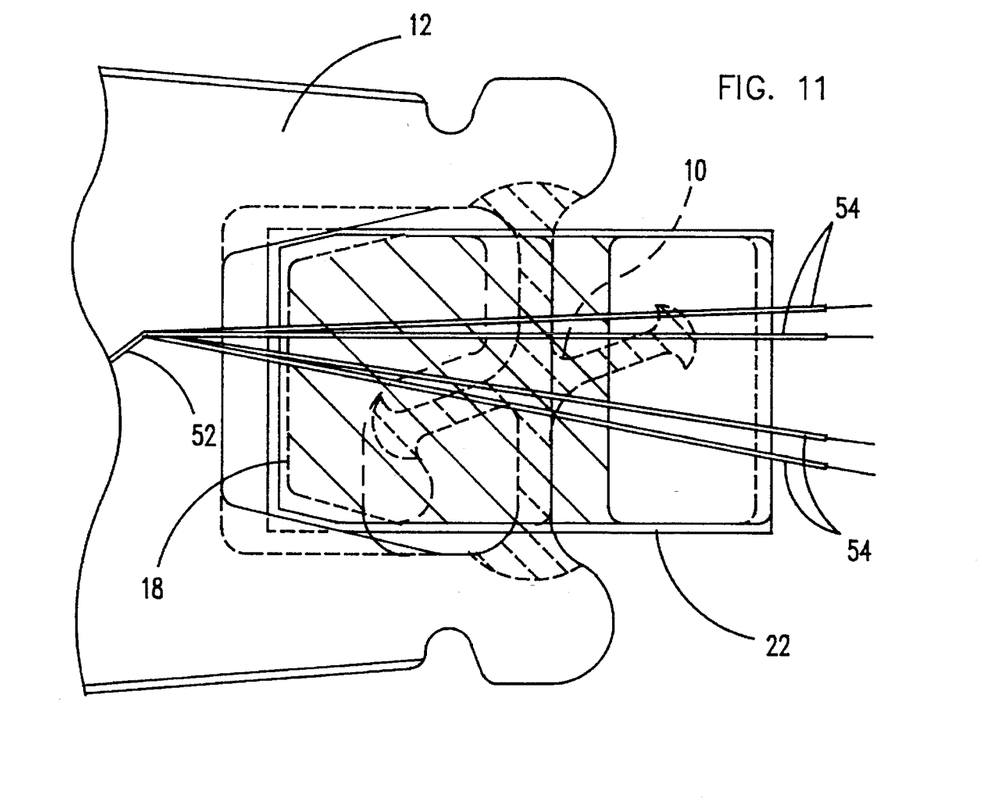
FIG. 11 illustrates the wiring, cut and stripped of insulation, ready for bonding to the slider.

Thereafter, slider 22 may be glued to the attachment tabs 18 of flexure 10 as illustrated in FIG. 11 and the wires 54 bonded to attachment contact points on slider 22, as is conventional.

Physical constraint of the wires 54 by the insulating film 53 and tacking the wiring 52 with tack pads 60 isolates and prevents forces exerted on the wiring 52 at points displaced from tack pads 60 and insulating layer 53 from pulling the wires 54 such that the electrical connections between wire 54 and slider 22 are broken. The tack pad 60 and insulating layer 53 holds the wiring 52 in a plane approximately the plane of the load beam 12 and flexure 10. This enhances the compactness of the load beam head suspension assembly and minimizes the height consumed by the wiring 52.

Figure 12:
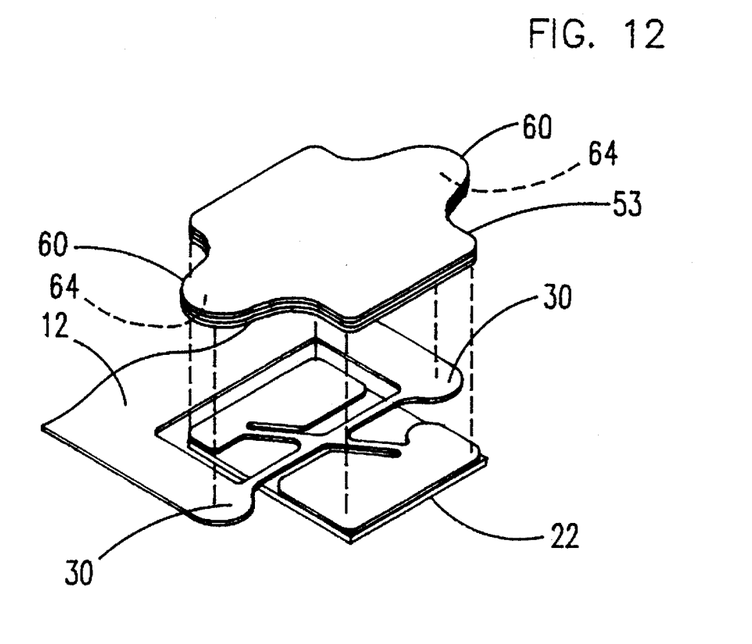
FIG. 12 illustrates an exploded view of a damping layer provided with extended tabs for engagement with the load beam arms.

The insulation layer 53 illustrated in FIG. 10 may be further provided with bonding tabs 60 as illustrated in FIG. 12. If the insulation layer 53 of FIG. 10 is utilized as a flexure damper as shown in FIG. 12, the bonding between the insulating film 53, bonding tab 60, and the distal arms 30 of load beam 12 may be spot bonds in order to maximize the damping effect. It is not necessary to area bond the insulating layer 53 to all portions of the flexure 10. The preferred structure of the layer 53 is a multi-layer arrangement where a Kapton or similar elastic material is sandwiched between layers of a visco-elastic material to constrain the viscoelastic layer and thereby enhance the ability of the viscoelastic layers to absorb the oscillation energy.

With reference to FIG. 12, with the insulating layer 53 serving as a flexure damper, it is noted that movement of the flexure structure 10 in a roll and pitch combination will cause distortion in the insulating/damper layer 53 and will exert forces through the layer 53 onto the tabs 60 at attachment points 64 bonded to the arms 30 of load arm 12. The distortion of the insulation layer 53 and the forces exerted on bonding tabs 60 will absorb substantial energy and thus quickly dampen any undesired oscillations of slider 22.

Providing the bonding tabs 60, as shown in FIG. 12, and utilizing the insulation layer 53 as part of the flexure damping system eliminates the need to add an additional thickness of material, conserving space that would otherwise be necessary for any additional elements.

Figure 13:
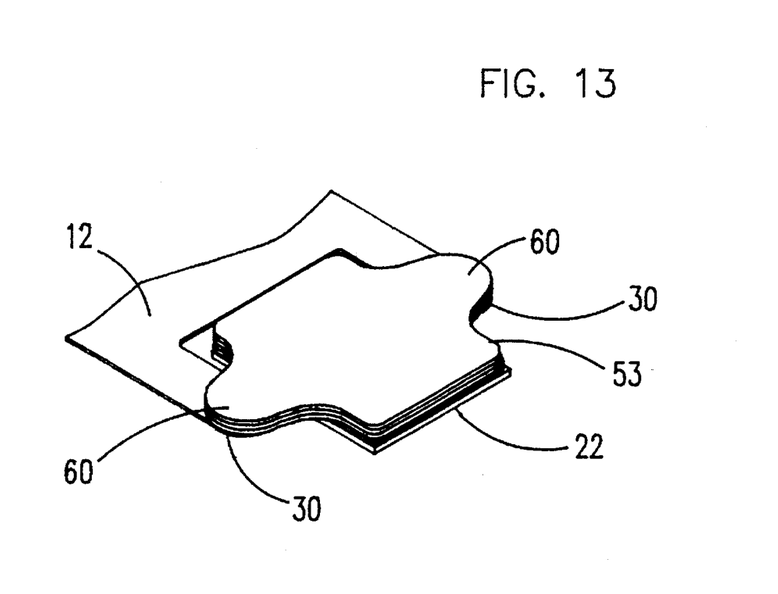
FIG. 13 is an assembled view of the damping layer installed on the flexure.

FIG. 13 illustrates the completely assembled load beam 12 and incorporates therein the individual aspects of the various embodiments previously mentioned. It should be understood that the explanations with respect to the relative parts and elements in the previous embodiments are equally applicable to the corresponding element within FIG. 13. Accordingly, redundant description is not necessary.

Referring to FIG. 14, a disk drive 70 is represented. The disk drive 70 is illustrated with any cover associated therewith removed. Because this cover is not an essential part of this invention, it is not shown.

Magnetic disk 65 is rotatably supported on base plate 63 and rotatable by drive motor 66. In order to access data stored on the, disk 65 or to write data to disk 65, the slider 22 is positioned adjacent to disk 65 in one of several positions to access different paths on circular recording tracks 68. The movement of slider 22 from one track 68 to another track 68 is controlled by load arm 12, which is pivotally mounted to base 63.

Load arm 12 is pivoted about pivot shaft 72 by an actuator drive 74, which may be a voice coil motor or other electrically actuated positioning control. Although not shown, an electronic control of the disk drive 70 is provided for data storage and retrieval as well as for positioning the load beam 12 and slider 22 and for rotating the disk 65 as is conventional in disk drives.

The assembly depicted in FIG. 14 may be enclosed in a cartridge shell, not shown, and may be inserted into a receiving portion which contains the electronic controls and the drive 70 for the disk 65, should be a removable cartridge disk drive be desired.

It should be further understood that individual embodiments of the invention may be incorporated into a load beam assembly without the inclusion of all of the elements, although the preferred embodiment is to incorporate all of the improvements in a single load beam assembly. It should be further understood that minor changes and modifications in the described devices may be made without departing from the scope of the invention described in the attached claims, inasmuch as the description and drawings are illustrative only.

We claim:

1. A load beam for use in a data storage disk drive comprising:

a rigid beam structure having a pair of ends, one end terminating in a pair of projecting rigid arms;

a slider;

a flexure support means for supporting said slider;

said slider attached to said flexure support means in at least a single attachment point;

said flexure support means formed of a pair of substantially uniform cross section linear beams, each said beam having an axis, one of said linear beams spanning said rigid arms and the other of said linear beams intersecting said one of said linear beams such that the axes of said beams intersect at an angle forming an acute angle;

said other of said linear beams terminating in enlarged attachment pads, said attachment pads having an attachment surface for attachment to said slider;

an electrically insulating layer overlaying and attached to said flexure support means and further comprising tab portions extending outwardly from said layer and overlying said projecting rigid arms at a junction of said rigid arms and said flexure support means;

said tab portions bonded to said projecting rigid arms at said junction of said rigid arms and said flexure support means and said insulating layer bonded to said flexure support means;

said rigid beam structure further comprising a rigid pitch and roll movement limiting surface separate from said linear beams, and overlaying and engageable by a portion of said slider, whereby slider pitch and roll movement about each of said axes is limited and said insulating layer will absorb energy due to distortion of said layer caused by oscillations of said slider and said flexure support means and dampen said oscillations.

2. The load beam of claim 1 wherein said flexure support means is integrally formed with said projecting rigid arms.

3. The load beam of claim 1 wherein said flexure support means comprises a projecting spacing means disposed on said flexure support means and intermediate said flexure support means and said slider.

4. The load beam of claim 3 wherein said projecting spacing means is formed in a frustroconical shape with the smaller of two planar surfaces positioned for engagement with said slider.

5. The load beam of claim 1 wherein said insulating layer is fabricated from a sheet of thermoplastic material.

6. The load beam of claim 5 wherein said insulating layer comprises a constraining layer between layers of a viscoelastic material.

7. The load beam of claim 1 further comprising electrical wiring including a plurality of individual wires extending from said load beam, past said insulating layer and joined to said slider, said wires forced into said insulating layer, whereby said insulating layer performs a function of strain relieving said wires as well as damping said oscillations of said slider.

8. The load beam of claim 7 wherein said electrical wiring is retained in a plane substantially parallel to a plane of said load beam and said flexure support means.

9. The load beam of claim 1 wherein said limiting surface overlies and is engageable with at least two corners of said slider.

10. The load beam of claim 1 wherein said limiting surface overlies and is engageable with four corners of said slider.

11. A load beam for use in a data storage disk drive comprising:

a rigid beam structure having a pair of ends, one end terminating in a pair of parallel projecting rigid arms;

a slider;

a flexure support means for supporting said slider;

said slider attached to said flexure support means in at least a single attachment point;

said flexure support means formed of a pair of substantially uniform cross section linear beams, one of said linear beams spanning said rigid arms and the other of said linear beams intersecting said one of said linear beams, said linear beams having axes, said axes intersecting at an angle, said linear beams defining axes of pitch and roll movement of said slider;

said other of said linear beams terminating in enlarged attachment pads, said attachment pads having an attachment surface for attachment to said slider;

an adhesive layer engaged with said attachment surface, said slider engaged with said adhesive layer;

an electrically insulating layer overlaying said flexure support means, said insulating layer attached to said flexure support means, said attachment pads and said rigid projecting arms of said load beam where said flexure support means intersects said rigid projecting arms;

a spacing means of frustroconical shape disposed intermediate said flexure support means and said slider;

a plurality of wires connected to said slider and overlying and fixedly engaged with an exposed surface of said insulating layer; and at least a plurality of pitch and roll movement limiting surfaces separate from said linear beams and formed on said rigid beam structure, overlying and engageable by said slider for limiting the extent of pitch and roll movement of said slider about axes of rotational movement defined by said flexure support means.

12. A disk drive comprising:

a rotatable magnetic disk for magnetically recording and storing digital data;

an access means for disposing at least a magnetic read/write head in proximity to said disk and at varying locations with respect to said disk;

means for rotating said disk relative to said access means;

said access means further comprising at least a load beam, said load beam including:

a rigid beam structure having a pair of ends, one end terminating in a pair of projecting rigid arms;

a slider;

a flexure support means for supporting said slider;

said slider attached to said flexure support means in at least a single attachment point;

said flexure support means formed of a pair of substantially uniform cross section linear beams, one of said linear beams spanning said rigid arms and the other of said linear beams intersecting said one of said linear beams, said linear beams having axes, said axes intersecting at an angle;

said other of said linear beams terminating in enlarged attachment pads, said attachment pads having an attachment surface for attachment to said slider, said attachment surface adhesively attached to said slider;

an insulating layer overlaying said flexure support means and further comprising tab portions extending outwardly from said layer and overlaying said projecting rigid arms at a junction of said rigid arms and said flexure support means;

said tab portions bonded to said projecting rigid arms at said junction of said rigid arms and said flexure support means and said insulating layer bonded to said flexure support means;

electrical wiring connected to said slider, wherein said load beam and said projecting arms partially circumscribe and define an open region within which said flexure support means and said slider are disposed, and wherein said load beam and said projecting arms further comprise extensions projecting into said open region and forming rigid pitch and roll movement limiting surfaces overlaying and engageable by a portion of said slider, whereby slider pitch and roll movement about said axes is limited and said insulating layer will absorb energy due to distortion of said layer caused by oscillations of said slider and said flexure support means and dampen said oscillations.

13. The disk drive of claim 12 wherein said flexure support means in integrally formed with said projecting arms.

14. The disk drive of claim 12 wherein said flexure support means comprises a projecting spacing means intermediate said flexure support means and said slider.

15. The disk drive of claim 14 wherein said projecting spacing means is formed in a frustroconical shape with the smaller of two planar surfaces positioned for engagement with said slider.

16. The disk drive of claim 12 wherein said insulating layer is fabricated from a sheet of thermoplastic material.

17. The disk drive of claim 16 wherein said insulating layer comprises a constraining layer between layers of a visco-elastic material.

18. The disk drive of claim 12 further comprising electrical wiring including a plurality of individual wires extending from said load beam, past said insulating layer and joined to said slider, said wires forced into said insulating layer, whereby said insulating layer performs a function of strain relieving said wires as well as damping said oscillations of said slider.

19. The disk drive of claim 12 wherein said electrical wiring is retained in a plane substantially parallel to a plane of said load beam and said flexure support means.

20. The disk drive of claim 12 wherein said limiting surfaces overlie and are engageable with at least two corners of said slider.

21. The disk drive of claim 12 wherein said limiting surfaces overlie and are engageable with four corners of said slider.

* * * * *